United States Patent

[11] 3,545,734

[72] Inventor Cornelis Van Der Lely
 7, Bruschenrain, Zug, Switzerland
[21] Appl. No. 690,227
[22] Filed Dec. 13, 1967
[45] Patented Dec. 8, 1970
[32] Priority Dec. 20, 1966, 6617827;
[33] Jan. 23, 1967, 6601000,
[31] Netherlands

[54] CROP DRIERS AND METHODS OF DRYING CROP
 49 Claims, 17 Drawing Figs.
[52] U.S. Cl. .................................................. 263/37,
 34/216
[51] Int. Cl. .................................................. F27b 5/02
[50] Field of Search ......................................... 56/1, 20
 (Cursory); 263/37, 39, 52, 40; 34/137, 216, 218,
 227

[56] References Cited
UNITED STATES PATENTS
| 2,458,617 | 1/1949 | McConnaughay | 34/216 |
| 2,513,480 | 7/1950 | Heth | 263/40 |
| 2,767,717 | 10/1956 | Schlossmacher | 34/216 |
| 2,997,096 | 8/1961 | Morrison et al. | 34/216 |

Primary Examiner—John J. Camby
Attorney—Mason, Mason and Albright

ABSTRACT: A mobile crop drier which gathers and moves cut crop into a hot air path through an enclosure, the crop being continually tossed upwardly as it is carried along the path; the crop also being crushed as it moves into the path. The progress of the crop along the air path may be augmented by endless belts which may also serve for tossing the crop.

INVENTOR
CORNELIS VAN DER LELY

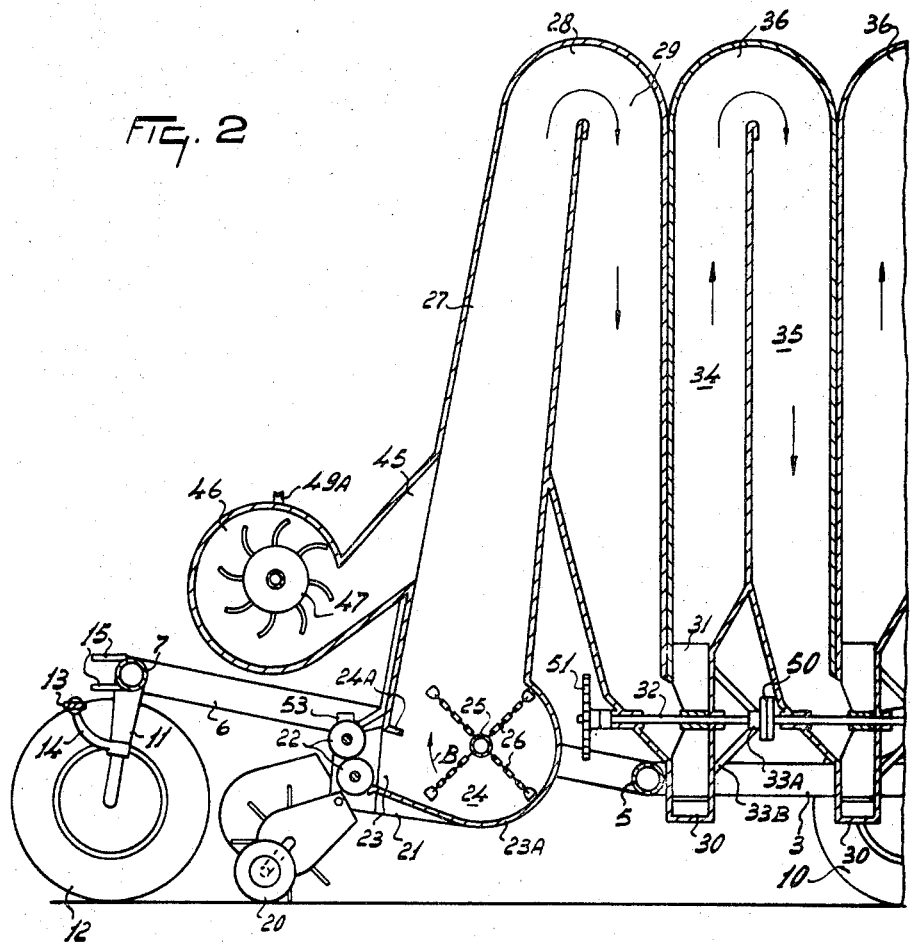

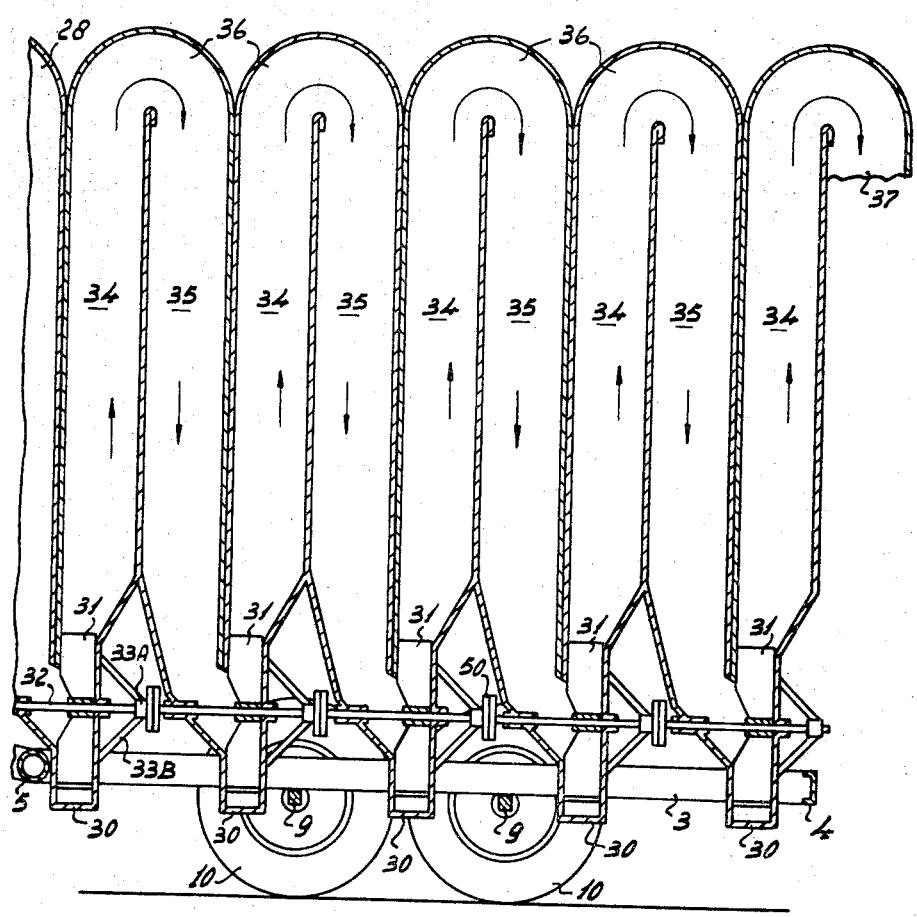

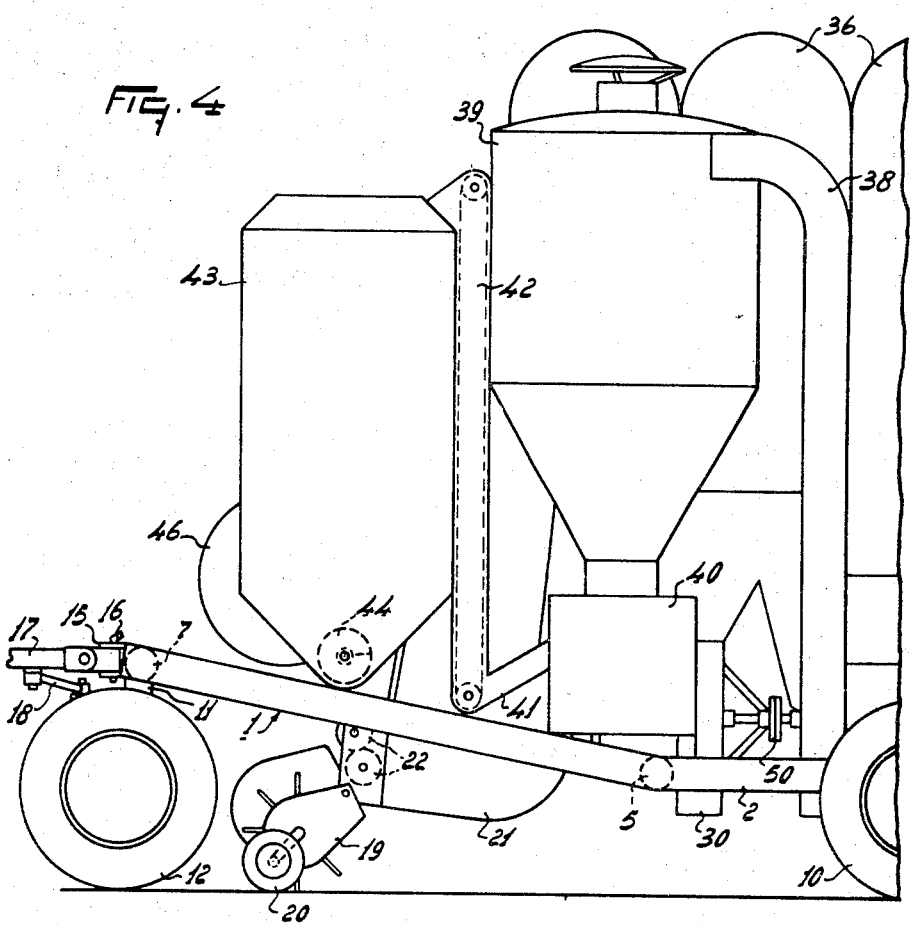

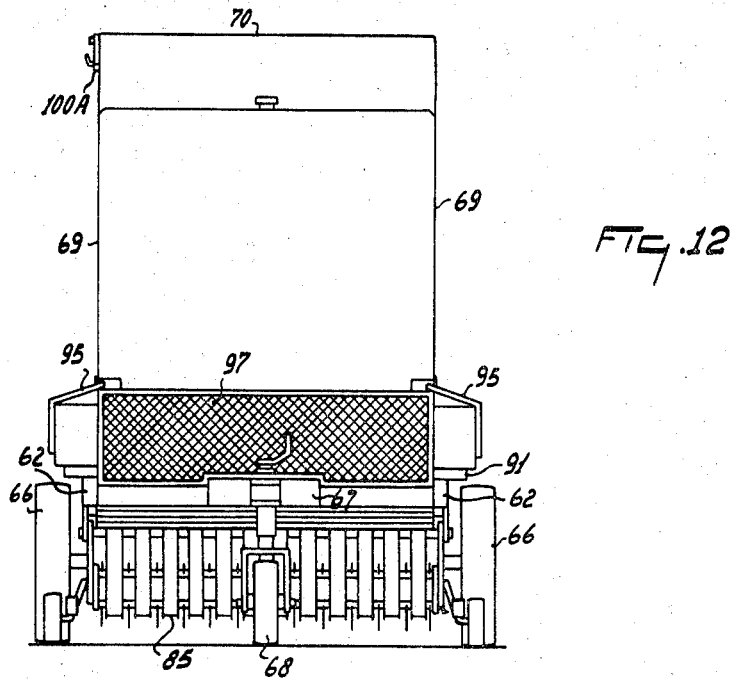
FIG.12
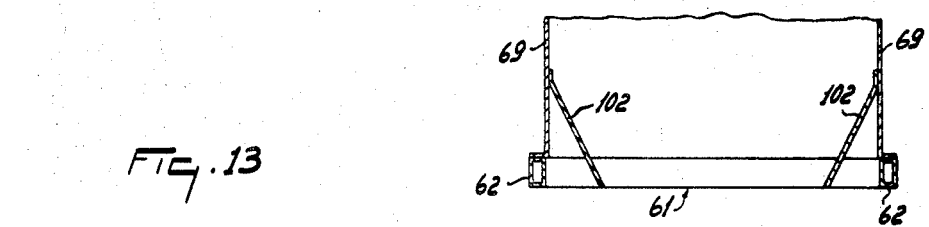
FIG.14
FIG.13
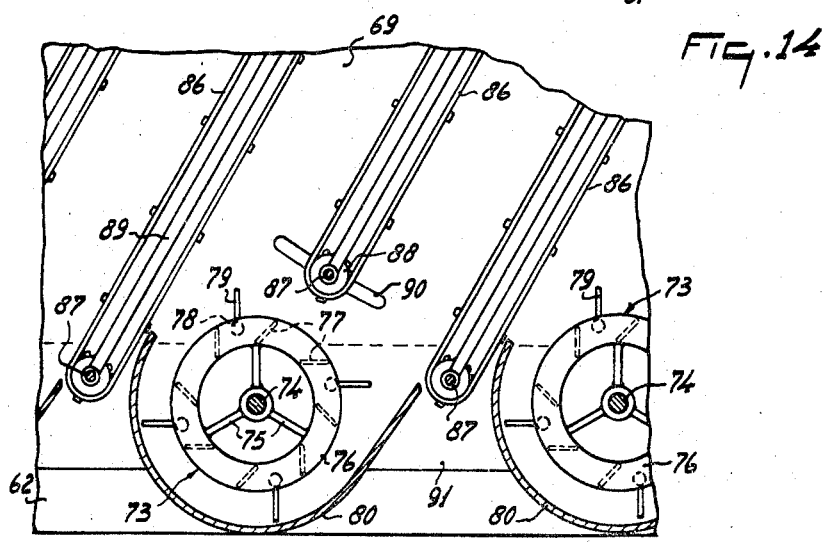

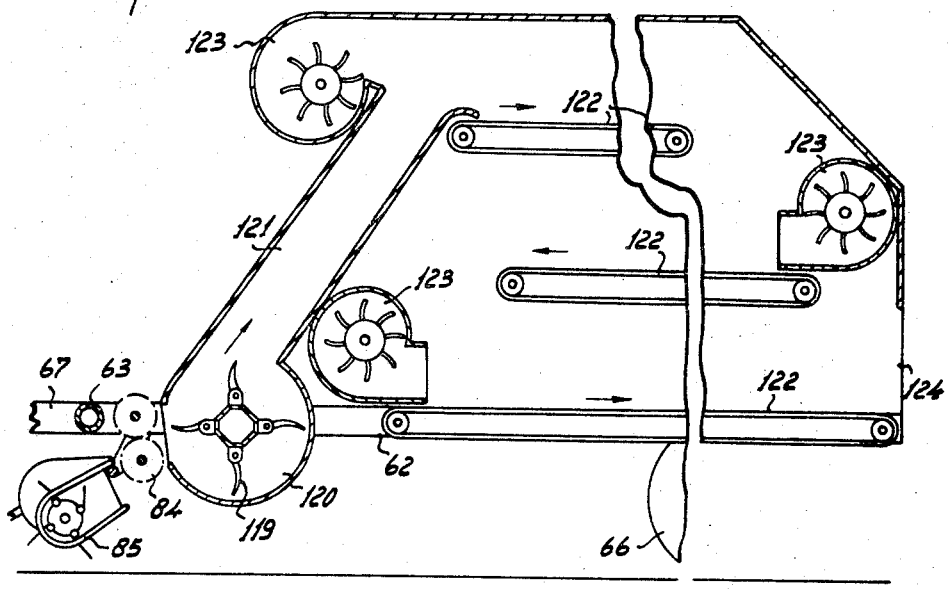

CROP DRIERS AND METHODS OF DRYING CROP

This invention relates to crop driers and methods of drying crop.

According to a first aspect of the present invention there is provided a mobile crop drier comprising an air heating system and means for displacing crop in a hot air stream produced by the heating system, said means comprising a plurality of devices disposed one after the other in the direction of movement of crop displaced by said means, said devices being arranged for displacing this crop in an upward direction in said hot air stream.

According to a second aspect of the present invention there is provided a crop drier adapted to be moved and to pick up crop to be dried, the drier comprising a heating system and means for displacing the crop to be dried, there being a wafer press attached to the drier.

According to a third aspect of the present invention there is provided a crop drier adapted to be moved having a pickup mechanism to pickup crop to be dried, the pickup mechanism being provided on one side of a front part of the drier.

According to a fourth aspect of the present invention there is provided a crop drier comprising an air heating system and means for displacing crop to be dried in a hot air stream produced by the heating system, said means comprising a plurality of fans disposed one after the other in the direction of movement of crop displaced by said means which fans are arranged to displace this crop in an approximately vertical direction in said hot air stream.

According to a fifth aspect of the present invention there is provided a method of drying crop comprising the steps of mechanically picking up the crop to be dried from the field, and conveying the crop in a crushed or chopped state through a crop drier.

For a better understanding of the invention and to show how the same may be carried into effect, reference will now be made, by way of example, to the accompanying drawings, in which:

BRIEF DESCRIPTION OF THE DRAWINGS

FIG. 2 is a sectional side view of the front part of the crop drier of FIG. 1, taken on the line II–II of FIG. 1, FIG. 3 is a sectional side view of the rear part of the crop drier of FIG. 1, taken on the line II–II of FIG. 1, FIG. 4 is an exterior side view of the front part of the crop drier of FIG. 1 as seen in the direction of the arrow IV of FIG. 1, FIG. 12 is a front end view of the crop drier of FIG. 10, FIG. 13 shows on an enlarged scale a conveying member and the endless conveyors arranged above the former, FIG. 14 is a sectional view taken on the line XIV–XIV of FIG. 10, FIG. 17 is a sectional view like FIG. 15 of a fifth form of a drier according to the invention.

DESCRIPTION OF THE PREFERRED EMBODIMENTS

Figure 1:
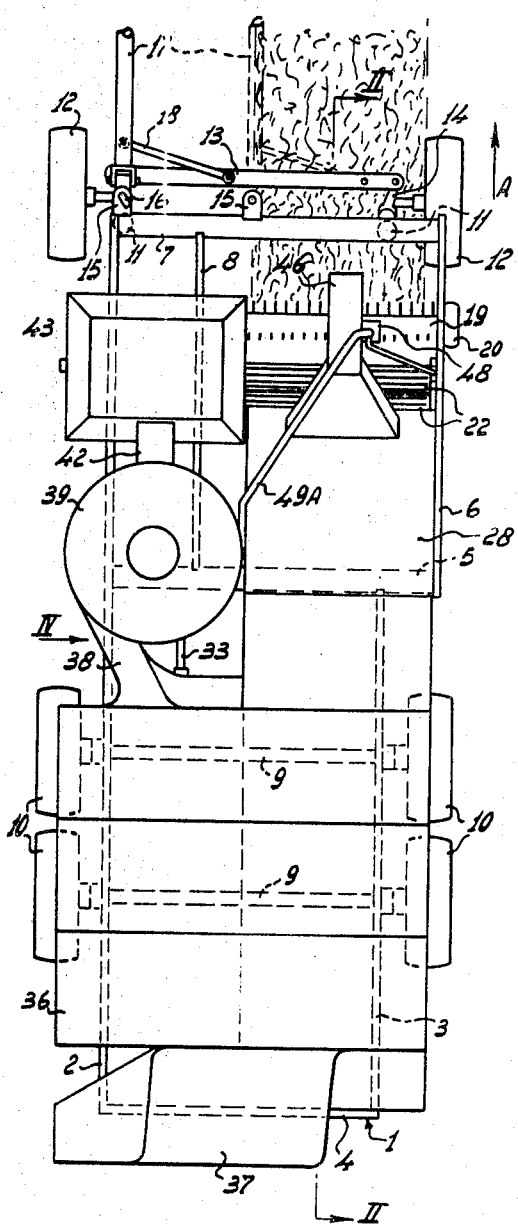
FIG. 1 is a plan view of a first form of crop drier.

The crop drier shown in FIGS. 1 to 7 has a frame 1 made up of two substantially horizontal, parallel frame beams 2 and 3, which are interconnected at the rear by a frame beam 4 extending transversely of the longitudinal center line of the drier. From FIG. 1 it will be apparent that the frame beam 2 is longer than the frame beam 3, and that between the end of the frame beam 3 remote from the beam 4 and the frame beam 2 a tube 5 extends transversely of the longitudinal center line of the drier, parallel with the frame beam 4. The tube 5 is longer than the frame beam 4 and extends beyond the frame beam 3. From FIG. 4 it will be apparent that the frame beam 2 extends slightly upwards from the tube 5. A frame beam 6, secured to the end of the tube 5 that extends beyond the beam 3, extends parallel with the front end of frame beam 2.

Between the front ends of the frame beams 2 and 6 a tube 7 extends transversely of the longitudinal center line of the drier. Between the tubes 5 and 7 and at about one third of the distance between the beams 2 and 6, a beam 8 extends parallel with the beams 2 and 6. On either side of the center of the frame beam 3 the frame beams 2 and 3 carry shafts 9 which extend transversely of the longitudinal center line of the drier and the ends of which each carry a ground-wheel 10. At the front of the drier the tube 7 carries a ground-wheel 12 at each end, each wheel 12 being able to pivot about substantially vertical shafts in bearings 11. The two wheels 12 are coupled with each other by means of a track rod 13 and steering pivot pins 14.

Near one end of the tube 7 a drawbar 17 is attached to a first pair of lugs 15 by means of a pin 16 which is passed through openings in these lugs 15. The drawbar 17 is connected by a rod 18 with the track rod 13. Near the center of the tube 7 a second pair of lugs 15 is provided for securing the drawbar 17 in the position indicated in broken lines in FIG. 1. When the first pair of lugs 15 are utilized the drier is towed in a position offset from the towing tractor, this being the operative towing position. The broken line position of the drawbar 17 is used for transporting the drier from place to place.

Between the frame beams 6 and 8, near the front of the drier, a pickup drum 19 is mounted for rotation about an axis extending transversely of the longitudinal center line of the drier. The pickup drum 19, which is of known construction, is supported from ground-wheels 20 located one on each side of the drum 19. To the rear of the pickup drum 19 so as to receive cut crop therefrom two cooperating crushing rollers 22 are disposed one above the other between vertical plates 21 secured to the frame 1. The upper crushing roller is mounted in a manner not shown so that it is capable of deflecting resiliently in a vertical direction. The crushing rollers 22 are located at the front of a channel 23 leading to a housing 23A accommodating an ejector 24 which is able to rotate about an axis extending transversely of the longitudinal center line of the drier. The ejector 24 is formed by flexible ejecting members 26 extending from a rotary shaft 25.

The housing 23A communicates with the lower end of a channel 27 that is substantially upright as viewed from the front of the drier, but is slightly inclined to the rear as viewed from the side of the drier (see FIG. 2). At its upper end the channel 27 terminates in a channel portion 28 of arcuate shape as viewed from the side, which portion joins a downwardly extending channel 29 which tapers in downward direction and opens out into a housing 30 of a fan 31. The rotary shaft 32 of the fan 31 extends substantially parallel with the longitudinal center line of the drier.

Figure 7:
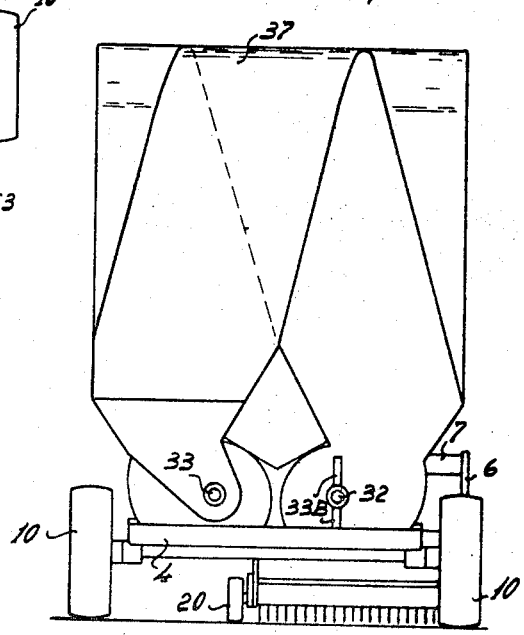
FIG. 7 is a rear end view of the crop drier of FIGS. 1 to 6.
Figure 6:
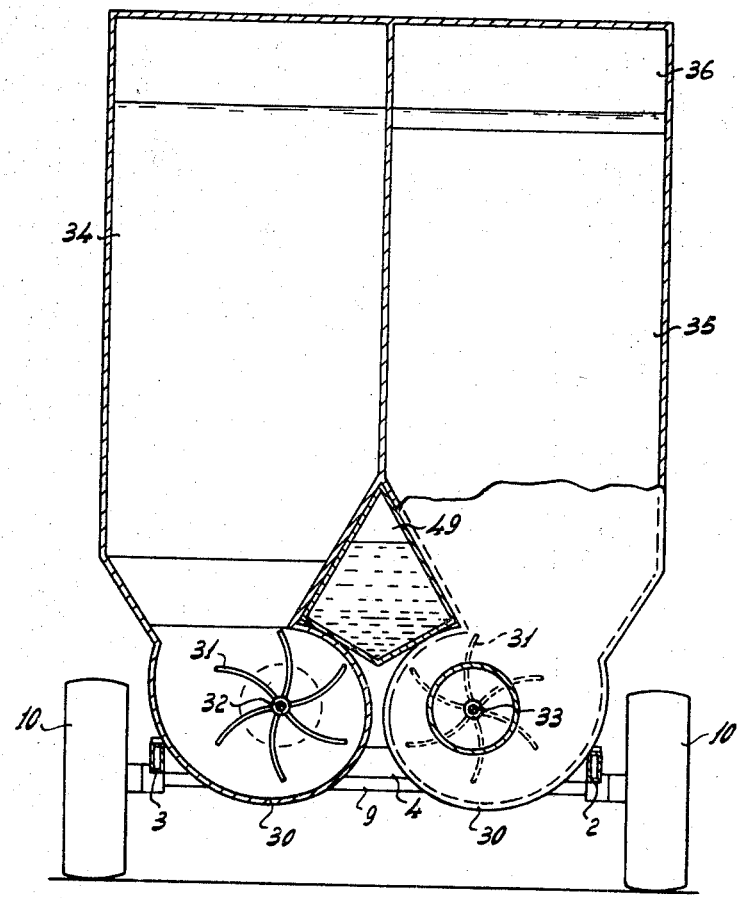
FIG. 6 is a sectional end view of the crop drier of FIGS. 1 to 5 taken on the line VI–VI of FIG. 5.

There is, in the drier, a row of five fans 31 all mounted on shafts 32 so as to be disposed on one side of the longitudinal center line of the drier. On the other side of this longitudinal center line there is a row of four fans 31 mounted on shafts 33 that is parallel with the shaft 32 common to the first-mentioned five fans 31. The shafts 32 and 33 are journalled in bearings 33A which are connected by means of supports 33B with the respective fan housings 30. The housings 30 of the fans 31 communicate with each other by vertical channels 34 and 35, each tapering towards its opening into its associated fan housing 30. The upper ends of each pair of channels 34 and 35 communicate with each other through a channel portion 36 of arcuate shape, the channel portions 28 and all the channel portions 36 being convex in the direction away from the channels 27, 29, 34 and 35. Between the housing 30 of the rearmost fan 31 of the row of five fans 31 and the housing 30 of the rearmost fan 31 of the row of four fans 31 a channel 37 extends as is shown in FIG. 7. The housing 30 of the foremost fan 31 of the row of four fans 31 communicates through a channel 38 (FIG. 4) with the upper end of a cyclone 39.

The lower end of cyclone 39 opens out in a wafer press 40 (not shown in detail) of generally known structure. The wafer press 40 communicates, through a channel 41, with the lower end of an elevator 42, which conveys the wafers or cakes from the press into a container 43 located in front of the cyclone 39. The container 43 is provided in its lower end with a worm conveyor 44 extending transversely of the longitudinal center line of the drier for conducting away the wafers or cakes from the container.

Ahead of the channel 27 that communicates with the housing 23A of the ejector 24 there is a housing 46 of a fan 47, this housing 46 communicating with the channel 27 via a channel 45 that ascends obliquely in the direction towards the rear of the drier and enters the channel 27 at a distance above the housing 23A. By means of the fan 47 air passed along a heating system 48 is blown into the channel 27 and the system of channels 28, 29, 34, 35, 36, 37, located thereafter. A fuel container 49 (FIG. 6), communicating through a duct 49A with the heating system 48, is located just above the two rows of fan housings 30.

FIGS. 2 and 3 show that between the fans 31 flexible couplings 50 are arranged between the shafts 32 and 33. Each coupling 50 is located in a space bounded by intercommunicating channels 34 and 35 extending from two adjacent fan housings 30. At its front end each foremost driving shaft 32 and 33 is provided with a sprocket wheel 51, which is shown for the shaft 32 in FIG. 2. The sprockets 51 can be driven by means of a chain in a manner not shown by a driving shaft connectable with the power takeoff shaft of a tractor coupled to the drawbar 17. The pickup drum 19, the crushing rollers 22 and the further movable parts of the drier may also be driven by this driving shaft, which is not shown for the sake of clarity.

Figure 8:
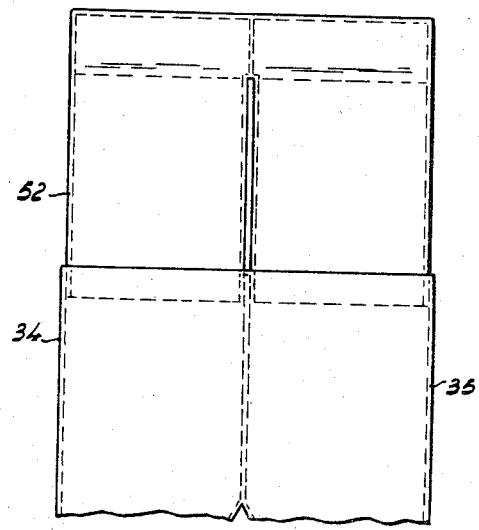
FIG. 8 is a diagrammatic end view of part of a modified form of the crop drier of FIGS. 1 to 7.
Figure 5:
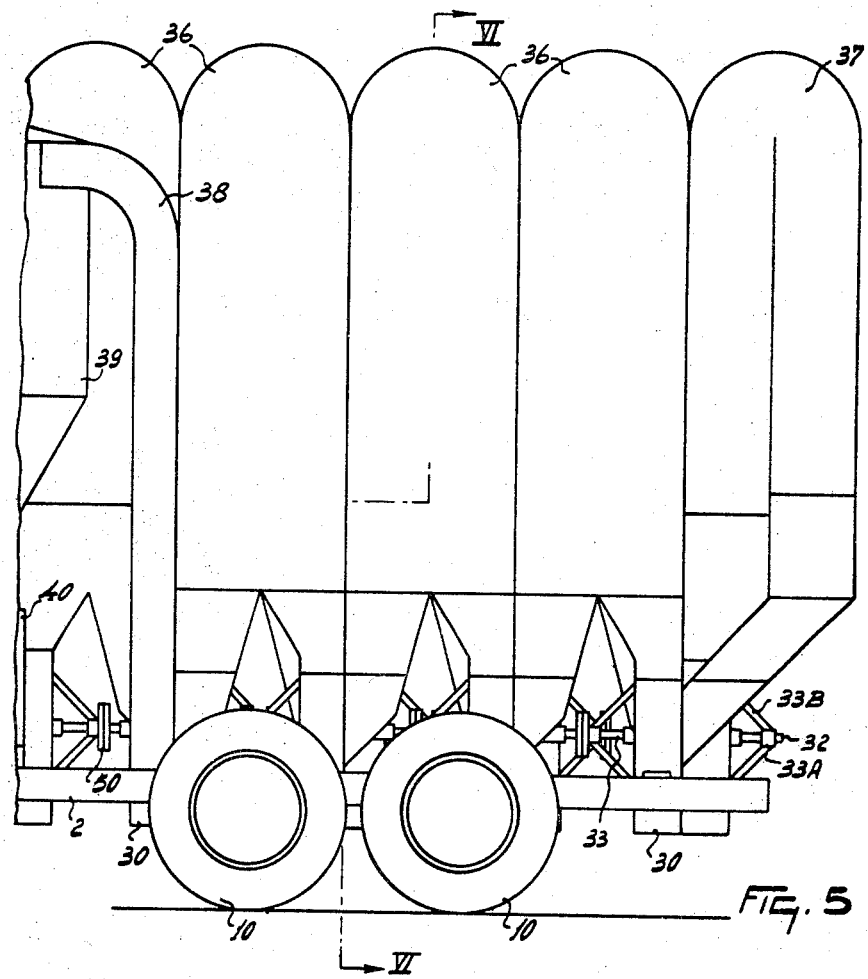
FIG. 5 is an exterior side view of the rear part of the crop drier of FIG. 1 as seen in the direction of the arrow IV of FIG. 1.

In the modified form of FIG. 8, the length of the channels 27, 29, 34 and 35 may be increased by a vertically displaceable part 52 that replaces the channel portions 28 and 36 and that has a plurality of channels in line with the respective channels 27, 29, 34, 35 and 37. FIG. 8 shows diagrammatically the highest position of the part 52. By means of the part 52 a longer drying path for the crop can be obtained when working a field in which the height of the drier does not need to be restricted.

The drier described above operates as follows.

In operation the drier can be moved in the direction of the arrow A (FIG. 1), that is in the direction of its longitudinal center line by means of a tractor which is coupled with the drier by the drawbar 17 coupled to the first pair of lugs 15. The various parts to be driven can be driven in known manner by the power takeoff shaft of the tractor. The crop lying on the field is lifted by means of the pickup drum 19. The crop lifted by the pickup drum 19 is passed between the crushing rollers 22 and is conveyed through the channel 23 to within range of the flexible ejecting members 26 of the rotating ejector 24. The flexible ejecting members 26, which rotate in the direction of the arrow B (FIG. 2), are adapted to cooperate with an abutment fillet 24A for a further crushing of the crop. The members 26 throw the crop upwards into the channel 27. The crop so thrown is received in the air stream which has been heated by the heating system 48 and is provided by the fan 47. The airstream is blown with great speed obliquely upwards into the channel 27 to carry the crop up the channel 27.

At the upper end of the channel 27 the crop is conveyed around the channel portion 28 into the channel 29. At the bottom of the channel 29 the crop passes into the housing 30 of the first fan 31 which further crushes the crop and throws it upwards in the vertical channel 34, extending away from the fan housing 30, from whence the crop passes to the next channel 35 and thereafter to the housing 30 of the next fan 31. In this way the crop is conveyed, as is shown by the arrows in FIGS. 2 and 3, along a long zigzag track through the drier, while at points located one after the other in the direction of its movement the crop is crushed and thrown upwards vertically in the drying air stream, which stream is maintained by the various fans. At the end of the longer row of five pairs of channels 34, 35 the crop is conveyed through the channel 37 to the second shorter row of four pairs of channels 34, 35 to be again alternately crushed and thrown up in the heated air stream produced by the fans at points lying one after the other in the direction of movement of the crop. At the front end of the shorter row of fans 31 and channels 34, 35 the crop finally arrives at the cyclone 39 which passes the crop to the wafer press 40 from where the crop is conveyed in the form of wafers or cakes, via the elevator 42, to the container 43. In the drier shown in the FIGS. the crop is inserted on one side at the front and the processed crop is delivered on the other side also at the front. The drying method described above in which the crop is crushed during its conveyance and is thrown up at a plurality of points lying one after the other in the direction of movement of the crop in a substantially vertical direction in the drying air stream over a comparatively very long zigzag track results in a high intensive drying of the crop, whereas the wafer press connected with the drying system provides a completely ready product which can be passed direct to store, from which store it can be directly fed to the cattle.

A modified form of the drier, not shown, is provided with a prime mover so that the drier is self-propelling and can also be used as a stationary drier in which crop transported from the field is fed by the pickup drum into the remainder of the drier where it is processed in the manner described above.

The form shown in FIG. 8, in which the lengths of the channels 27, 29, 34 and 35 can be modified, is especially advantageous where the height of the drier does not have to be restricted and the degree of humidity of the crop is high.

Instead of the pickup drum a pickup mechanism comprising by a mowing device may be mounted at the front of the drier.

As stated previously, the upper crushing roller 22 is capable of deflecting in a vertical direction. By means of this movable crushing roller the supply valve 53 of fuel for the heating system 48 can be actuated. If no crop is disposed between the rollers 22, the fuel supply is cut off. Conversely, as the rollers 22 are urged further away from each other by the passing of crop therebetween the fuel supply is increased by the movement of the upper roller 22 so that heating of the air delivered by the fan 46 is increased, the drying power of the drying system being thus automatically varied to suit the quantity of crop supplied thereto.

Figure 9:
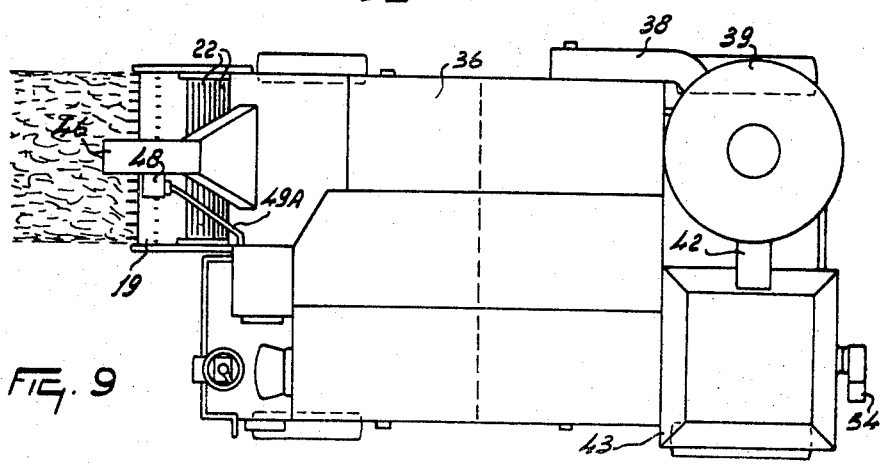
FIG. 9 is a diagrammatic plan view of a second form of crop drier.

Instead of being arranged in rows extending in the direction of operative travel, that is in the direction of the longitudinal center line of the drier, the rows of fans 31 and associated channels 34, 35 are, in the from of FIG. 9, arranged in two rows extending transverse of the longitudinal center line of the drier, that is transverse of the direction of travel. The drier shown in FIG. 9 is self-propelling. The fans and the channels, as well as the pickup mechanism and the heating system are similar to those of the drier of FIGS. 1 to 7. However, in the drier of FIG. 9 three fans are provided in each row. The cyclone 39 with the wafer press 40 and the container 43 are disposed one after the other at the rear of the drier and the container 43 is provided with a delivery part 54. The various parts of this drier can be driven by the engine of the drier itself.

A modified form of the drier of FIG. 9, not shown, is constructed so as not to be self-propelling.

The operation of the drier shown in FIG. 9 corresponds with that of the drier shown in FIGS. 1 to 7.

The crop drier shown in FIGS. 10 to 14 comprises a frame 61, having two parallel frame beams 62, lying at a distance from each other and being interconnected by transverse beams 63, one of which is located at the front and the other at the rear.

On the lower side of each of the frame beams 62, approximately at the center of the drier, a support 64 is provided for an axle 65, each end of which is provided with a ground-wheel 66. Near the center of the foremost transverse beam 63 a drawbar 67 is secured, which is supported near its front by a ground-wheel 68 (see FIG. 12). Vertical walls 69 are arranged on the frame beams 62 so as to extend in the longitudinal direction thereof. On the upper side these walls are connected with each other by means of an at least approximately horizontal wall 70. On the rear side the walls 69 are interconnected by means of a vertical wall 71, whereas at the front the vertical walls 69 are interconnected by an obliquely reclining wall 72. The superstructure thus formed accommodates below at regular intervals a number (in this embodiment six) of rotatable conveying members 73, arranged one behind the other. Each of the conveying members 73 extends substantially throughout the width of the device and is adapted to rotate about a rotary shaft 74, extending transversely of the longitudinal center line of the device. The rotary shaft 74 is journaled at its ends in the walls 69. At a distance of each other rings 76 are arranged on the shaft 74 by means of spokes 75. Between the rings 76 blades 77 extend transversely parallel to the rotary shaft. In the embodiment shown eight blades are provided for each conveying member 73 (see FIG. 13). This number may be smaller, for example, four. Between the rings 76 four supports 78 are arranged at equal distances from each other so as to extend parallel to the rotary shaft 74. Each of the supports 78 is provided with tines 79, which are fastened to the supports at equal distances from each other.

Figure 10:
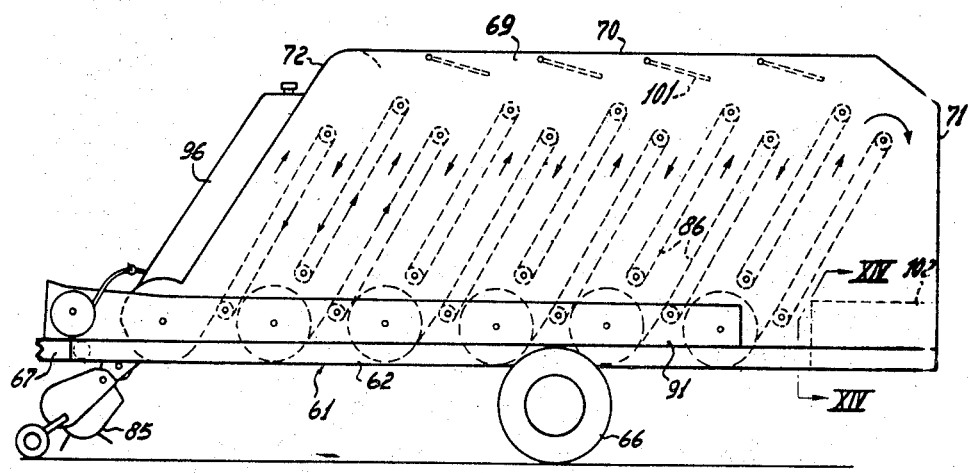
FIG. 10 is a diagrammatic side view of a third form of crop drier.

From FIGS. 10 and 13 it will be apparent that with the exception of the foremost member each rotatable conveying member 73, (formed by a drum provided with the tines 79, having a number of blades 77 between the tines 79 and the rotary shaft 74), is surrounded by a curved plate 80, which is concentric to the rotary shaft 74 on the lower side over at least approximately 180°. The plates 80 are arranged so that the upper sides of all these plates extend parallel to each other and are inclined to the rear. The upper sides extend approximately parallel to the obliquely reclining wall 72 at the front of the superstructure. The curved plate 80 forms a space, in which the conveying members are located at least partly. The foremost conveying member is surrounded on the lower side by a plate 81, extending concentrically to the shaft 74.

The rear side of the plate 81 is located on the same level as the rear sides of the plates 80. The front side of the plate 81 extends substantially horizontally and forms the boundary of an opening 82 located between said front side and the front side of a plate 83, concentric to the shaft 74. This plate surrounds partly the foremost conveying member 73 on the upper side and joins the lower side of the wall 72. The opening 82 thus formed lies behind two cooperating crushing rollers 84, having their rotary shafts supported near the frame beams 62. In front of the crushing rollers 84 is provided a pickup member 85, which may be of known structure and which will not be described further.

Figure 11:
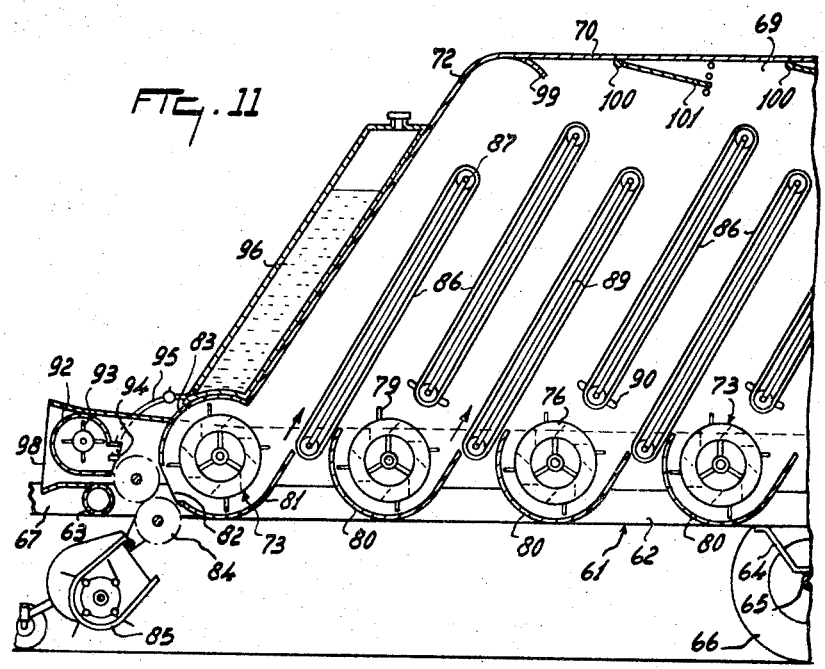
FIG. 11 is a sectional side view of the front part of the crop drier of FIG. 10.

From FIGS. 10, 11 and 12 it will be seen that the space above the rotatable conveying members accommodates a number of parallel, consecutive endless conveyors 86. The conveyors are inclined to the rear at about the same angle as the front wall 72 of the superstructure and they extend over the same width as the conveying members 73. The rotary shafts 87 of the conveyors 86, on which chain sprockets 88 are arranged, are journaled in the vertical walls 69 and connected with each other by means of supports 89, extending at right angles to the shafts 87 and located near the walls 69. In the arrangement of the conveyors 86 shown in FIGS. 10, 11 and 12 there is located in the space between two consecutive rotatable conveying members 73 and behind the rearmost member 73, in a lowermost shaft 87 of a conveyor and in addition, a conveyor 86 is arranged above each conveying member 73. The bearing of the lowermost rotary shaft 87 of each conveyor 86 arranged above a conveying member 73 is adjustable in a slot 90, which is concentric to the upper rotary shaft of the conveyor (see FIG. 13).

It will furthermore be apparent that no conveyor 86 is located above the foremost conveying member 73. The space wherein the foremost member 73 is located communicates with a channel formed by the obliquely reclining front wall 72 and the conveyor 86, lying foremost viewed from the front. The respective spaces enclosed by the curved plates 80, 81 and 83, wherein the conveying members 73 are located, communicate on opposite sides with feeder channels 91, extending in the longitudinal direction of the device (FIG. 12). The feeder channels 91 communicates with the outlets of casings 92 of ventilators 93. The outlet of each ventilator casing 92 accommodates a burner 94. The burners 94 communicate through a duct 95 with a tank 96. The ventilators 93 draw air through an inlet 98, closed by mesh 97 and accommodating at least partly the ventilator casings 92.

The obliquely reclining wall 72 is provided on the upper side with a portion 99, which is bent over to the interior. The upper wall 70 is provided at regular intervals with flaps 101, adapted to pivot about horizontal shafts 100 by means of arms 100A (see FIG. 12) whereby it can be selectively moved into and fixed in a plurality of positions (FIGS. 10 and 11). On the rear side beneath the last conveyor 86 swath boards 102 are fixed to the side walls 69 so as to extend obliquely downwards and inwards, between which boards an opening is left (see FIG. 14).

The drive of the various parts adapted to move in operation as described above is not illustrated in the FIGS. for the sake of clarity. The drive may be of generally known structure and be actuated by the power takeoff shaft of a tractor propelling the device or by an engine on the drier itself. The rotatable conveying members 73 may, for example, be driven by means of rope-and-pulley transmissions, which is indicated in the embodiment shown in FIGS. 15 and 16.

Figure 15:
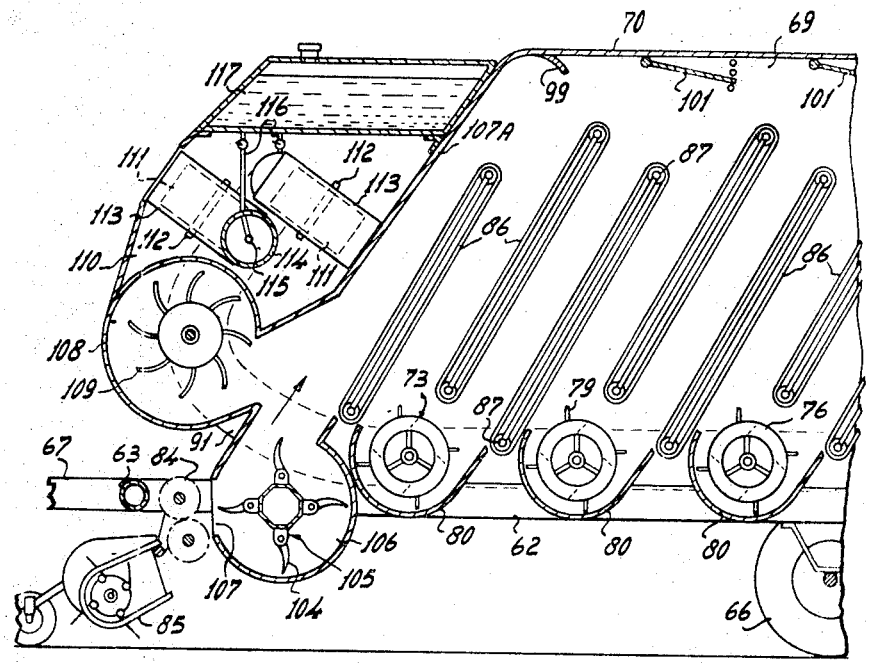
FIG. 15 is a sectional view taken on the line XV–XV in FIG. 16, which is a plan view of a fourth form of a drier according to the invention.
Figure 16:
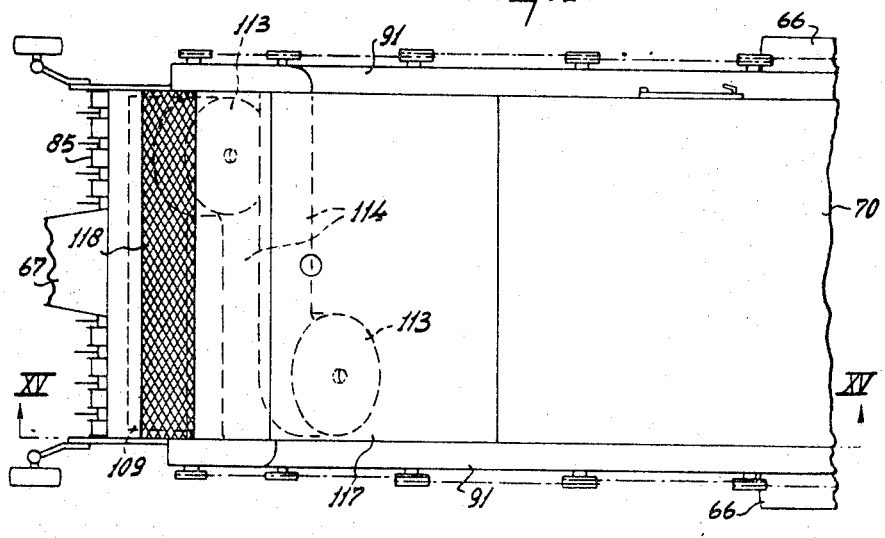

In the embodiment shown in FIGS. 15 and 16, which corresponds essentially with the foregoing embodiment a rotatable ejecting member 105, provided with pivotable clappers 104, is provided in lieu of the foremost conveying member. The ejecting member 105 is located in a space 106, having an opening 107 communicating with the crushing rollers 84. On the front side the device is provided with a wall 107A sloping upwardly to the rear and terminating on the lower side in a ventilator casing 108 of a fan 109. The ventilator casing 108 opens out in the channel formed between the wall 107A and the foremost conveyor 86 and communicates with the space accommodating the ejecting member 105.

Above the ventilator casing 108 a space 110 is formed in which two fans 111 are located. The fans 111 are located each on one side of the longitudinal center line of the device (FIG. 16). Each of the fans of the ventilators are adapted to rotate about a shaft 112, which extends at least substantially parallel to the wall 107A and is journaled in a casing 113. Each of the casings 113 communicates with a channel 114, in which a burner 115 is located, which communicates through a duct 116 with a fuel tank 117, located above the space 110. Each of the channels 114 communicates, in the same way as in the first embodiment, with the opposite ends of the spaces accommodating the ejecting members 73. For the supply of air to the fans 111 the space 110 has an inlet covered by a mesh 118.

In operation the drier can be propelled either by means of a tractor or by means of its own engine across the field. By means of the pickup mechanism 85 at the front, the crop lying on the field can be lifted and passed via the crushing rollers into the space accommodating the foremost conveying member 73. The conveying members 73, associated with the drying system of the device, and the conveyors 86 are driven in the directions of the arrows indicated in FIGS. 10 and 11. The crop passed via the crushing rollers 84 into the space of the foremost conveying member 73 is conveyed in the direction of the arrows through the drying system. Over the whole path to be covered by the crop, air heated by the burners 94 is blown by the ventilators 93 through the feeder channels 91 on either side of the device into the spaces of the conveying members 73. By means of the blades 77 this air is pushed upwards so that the crop is constantly exposed to this flow of air, in the channel between the conveyors 86. The conveying members 73 act also as fans. The crop is conveyed in the upward direction by means of the conveying members 73, which move at a high speed and provide a fine division of the crop. This upward movement is assisted by further conveying means formed by the endless conveyors 86, which move at a lower speed and which are arranged, viewed in the direction of displacement of the crop, alternating with the conveying members 73. In this way a very intensive drying of the crop is achieved within a comparatively small space.

It will be apparent, inter alia from FIGS. 10 and 11, that a channel extends to the rear side above the endless conveyors 86. Through this channel, in which, in operation a substantially horizontal flow of air passing above and across the conveyors is maintained, light and dried quantities of crop can be directly conducted away to the rear side of the device, where it can leave the device by passing between the swath boards 102. By means of the adjustable flaps 101 on the upper side the speed of flow of the material can be controlled. It is also possible to vary, in known manner, the speed of the various conveying members and the endless conveyors arranged above the former. By adjusting the lower side of a conveyor 86, arranged above a conveying member 73, the inlet or outlet opening for the conveying member may be enlarged or reduced to effect the flow and the disentanglement of the material by means of the tines 79.

The crop passed in the manner described above through the drying system may again be deposited on the field via the swath boards. From the swath the crop can be picked up in the dry state for further processing. A direct delivery to a place for storage is also possible, in which case the device may be stationary.

In the embodiment shown in FIGS. 15 and 16 the crop pushed into the drier and thrown up by the ejecting member 105 moves across the system in the same way as in the first embodiment. In this embodiment the flow of air produced by the fan 109 provides a more vigourous passage of air particularly through the channel above the conveyor 86. The clappers 104 also have a crushing effect on the crop.

In the embodiment shown in FIG. 17 an ejecting member 119 is arranged in a space 120, which communicates with the crushing rollers 84 and terminates in an obliquely reclining channel 121. The space after the channel accommodates three at least substantially horizontal endless conveyors 122, lying one above the other. The upper conveyor joins the upper end of the channel 121. At the front of the upper conveyor and on the other side of the channel 121 a fan 123 is arranged and further fans 123 are arranged near the rear side of the central conveyor and the front side of the lowermost conveyor. Although this is not shown, burners may be provided for heating the air to be blown by the fans across the conveyor belts 122. The drive of the various, movable parts of the drier, as in the preceding embodiments, may be achieved in known manner and is not illustrated in detail for the sake of clarity.

In the embodiment shown in FIG. 17 the crop after having passed the crushing rollers 84, is thrown up by means of the ejecting member 119, provided with the clappers, into the channel 121, which communicates with the space 120. At the upper end of the channel 121 the crop arrives at the upper endless conveyor 122. During the displacement across the conveyor the crop is exposed to the flow of air produced by the fan 123 at the front end of the conveyor. The flow of air produced across the upper end of the channel 121 has a suction effect which accelerates the upward movement of the crop. At the end of the upper conveyor the crop drops on the next conveyor, located beneath the former, so that by means of the flow of air produced by the fan 123 at the rear end of the conveyor and the movement of the conveyor the crop is displaced again to the front. From the front end of the central conveyor the crop arrives at the lowermost conveyor, where it is displaced by means of the flow of air produced by the fan 123 at the front and by the movement of the conveyor to the rear, from where the crop can be conducted away through an opening 124. Although this is not shown, also the last-mentioned embodiment may be provided with a heating system, the heated air being blown by the fans 123 across the various conveyors. In the driers comprising the drying systems described above the crop is drastically dried, and a maximum drying effect is obtained by the relative positions of the rapidly conveying members and the further conveyors moving with lower speed provided for displacing the crop.

I claim:

1. A crop drier comprising a mechanism for picking up crop, means for crushing the crop, an air heating system and means for displacing crop to be dried in a hot air stream produced by the heating system, said means for displacing crop being arranged to displace said crop in an upward direction in said hot air stream and a plurality of consecutive channels each extending in an upward direction and through which the crop to be dried is conveyed, said channels being disposed relative to each other so that, viewed from one side with respect to the direction of movement of crop along the channels, a zigzag track is formed for the crop.

2. A crop drier comprising a mechanism for picking up crop, means for crushing the crop, an air heating system and means for displacing crop to be dried in a hot air stream produced by the heating system, said means for displacing crop being arranged to displace said crop in an upward direction in said hot air stream and a plurality of consecutive channels each extending in an upward direction and through which the crop to be dried is conveyed, said channels being disposed in two rows arranged side by side.

3. A crop drier as claimed in claim 2, wherein the number of channels of one row is greater than the number of channels of the other row.

4. A crop drier as claimed in claim 2, wherein the rows of channels communicate with each other at one end.

5. A crop drier comprising a mechanism for picking up crop, means for crushing the crop, an air heating system and means for displacing crop to be dried in a hot air stream produced by the heating system said means being arranged to displace said crop in an upward direction in said hot air stream, wherein the means for displacing crop comprise a plurality of fans disposed one after the other in the direction of movement of crop displaced by said means, wherein the fans are arranged near the lowest points of the channels.

6. A crop drier as claimed in claim 5, wherein two successive channels communicate with the housing of one fan.

7. A crop drier as claimed in claim 4, wherein two channels communicating with the housings of successive fans communicate with each other at their upper ends.

8. A crop drier as claimed in claim 5, wherein said upper ends communicate with each other through a channel portion of arcuate shape.

9. A crop drier as claimed in claim 4, wherein the two rows of channels communicate with each other at the rear end of the drier.

10. A crop drier as claimed in claim 3, wherein the crop to be dried is introduced into the channel, that is foremost with respect to the direction of movement of crop along the channel of the row of channels made up of the greater number of channels.

11. A crop drier as claimed in claim 3, wherein a wafer press is attached to the channel, which is hindmost with respect to the direction of crop along the channel of the row made up of the smaller number of channels.

12. A crop drier as claimed in claim 11, wherein a cyclone is provided between the wafer press and said last channel.

13. A crop drier as claimed in claim 5, wherein the channels are located one after the other with respect to the intended direction of operative travel of the drier.

14. A crop drier as claimed in claim 3, wherein a crop inlet in the superstructure is located on one side of the front of the drier, and wherein a wafer press with a container attached thereto is arranged on the other side of the front of the drier.

15. A crop drier comprising a mechanism for picking up crop, means for crushing the crop, an air heating system and means for displacing crop to be dried in a hot air stream produced by the heating system, said means for displacing crop being arranged to displace said crop in an upward direction in said hot air stream and a plurality of consecutive channels each extending in an upward direction and through which the crop to be dried is conveyed, said consecutive channels being arranged in a direction transverse of the direction of travel of the drier.

16. A crop drier as claimed in claim 15, wherein a cake press and a container are attached one after the other to the rear of the drier.

17. A crop drier comprising a mechanism for picking up crop, means for crushing the crop, an air heating system and means for displacing crop to be dried in a hot air stream produced by the heating system, said means being arranged to displace said crop in an upward direction in said hot air stream, a crop inlet, and an ejector near said crop inlet extending transversely of the intended direction of operative travel of the drier.

18. A crop drier as claimed in claim 17, wherein the ejector is located at the lower end of an upwardly extending channel, the upper end of which communicates with said plurality of consecutive channels.

19. A crop drier as claimed in claim 18, wherein the air heating system opens out into the channel at the lower end of which the ejector is located, whereby said hot air stream is directed obliquely upwards in the last-mentioned channel.

20. A crop drier comprising a mechanism for picking up crop, means for crushing the crop, an air heating system and means for displacing crop to be dried in a hot air stream produced by the heating system, said means for displacing crop being arranged to displace said crop in an upward direction in said hot air stream, a plurality of consecutive channels each extending in an upward direction and through which the crop to be dried is conveyed, and a fuel container for the air heating system which extends in the longitudinal direction of the drier and is located near the center of the drier at the level of the lower ends of said plurality of consecutive channels.

21. A crop drier as claimed in claim 20, wherein a fuel tank is located between the rows of channels.

22. A crop drier comprising a mechanism for picking up crop, means for crushing the crop, an air heating system and means for displacing crop to be dried in a hot air stream produced by the heating system, said means for displacing crop being arranged to displace said crop in an upward direction in said hot air stream and a plurality of consecutive channels each extending in an upward direction and through which the crop to be dried is conveyed, the length of said consecutive channels adapted to be increased.

23. A crop drier as claimed in claim 22, wherein the upper ends of said consecutive channels can be displaced in a vertical direction.

24. A crop drier for drying crop which comprises:
a frame;
a drying enclosure carried by said frame, said enclosure including an inlet for cut crop and dried crop outlet;
first air propelling means supported by said frame adapted to create a flow of air in said enclosure adapted to toss crop received from said inlet upwardly therein; and
second air propelling means supported by said frame adapted to create a flow of air in said enclosure for urging crop tossed by said first-mentioned flow of air in a substantially horizontal direction in a path leading to said dried crop outlet in said enclosure, which includes a crop pickup mechanism connected to said frame adapted to carry crop to said crop inlet.

25. A crop drier comprising a mechanism for picking up crop, means for crushing said crop, an air heating system and means for displacing the crop to be dried in a hot air stream produced by the heating system, said means for displacing crop comprising a plurality of consecutive channels through which the crop to be dried is conveyed, each of said channels extending in an upward direction, said channels including upper channel portions and being disposed relative to each other so that, viewed from one side with respect to the direction of movement of crop along the channels, a zigzag track is formed through said channels and said upper portions for the crop.

26. A crop drier as claimed in claim 25, wherein pressing means for wafers, cakes or the like is attached to the drier.

27. A crop drier as claimed in claim 25, wherein said pickup mechanism is provided on one side of a front part of the drier.

28. A crop drier as claimed in claim 25, wherein said channels are disposed in two rows arranged side by side, the number of channels of one of said rows being greater than the number of channels of the other of said rows.

29. A crop drier as claimed in claim 28, wherein said two rows of channels communicate with each other at one end.

30. A crop drier as claimed in claim 25, wherein the means for displacing crop comprise a plurality of fans disposed one after the other in the direction of movement of crop displaced by said means for displacing crop, the fans being arranged near the lowest points of the channels.

31. A crop drier as claimed in claim 30, wherein two successive channels communicate with the housing of one of said fans.

32. A crop drier as claimed in claim 29, wherein two channels communicating with the housings of successive fans communicate with each other at their said upper portions.

33. A crop drier as claimed in claim 32, wherein said upper channel portions are of arcuate shape.

34. A crop drier as claimed in claim 29, wherein said two rows of channels communicate with each other at the rear end of the drier.

35. A crop drier as claimed in claim 28, wherein the crop to be dried is introduced into the channel which is foremost with respect to the direction of movement of crop along the channel of the row of channels made up of the greater number of channels.

36. A crop drier as claimed in claim 28, wherein a wafer press is attached to the channel which is last with respect to the direction of crop along the channels of the row made up of the smaller number of channels.

37. A crop drier as claimed in claim 36, wherein cyclone means is provided between the wafer press and said last channel.

38. A crop drier as claimed in claim 25, wherein said channels are located one after the other with respect to the intended direction of operative travel of the drier.

39. A crop drier as claimed in claim 25, wherein a crop inlet in the superstructure of the drier is located on one side of the front of the drier, and wherein a wafer press with a container attached thereto is arranged on the other side of the front of the drier.

40. A crop drier as claimed in claim 25, wherein said consecutive channels are arranged in a direction transverse to the direction of travel of the drier.

41. A crop drier as claimed in claim 40, wherein a cake press and a container are attached one after the other to the rear of the drier.

42. A crop drier as claimed in claim 25, including a crop inlet, wherein near said crop inlet an ejector extends transversely of the intended direction of operative travel of the drier.

43. A crop drier as claimed in claim 42, wherein said ejector is located at the lower end of an upwardly extending channel of said channels, the upper portion of which communicates with said plurality of consecutive channels.

44. A crop drier as claimed in claim 43, wherein said air heating system opens out into said channel in the lower end of which said ejector is located, said hot air stream being directed obliquely upwards in the last mentioned channel.

45. A crop drier as claimed in claim 25, wherein a fuel container for the air heating system extends in the longitudinal direction of the drier and is located near the center of the drier and at the level of the lower ends of said plurality of consecutive channels.

46. A crop drier as claimed in claim 45, wherein said fuel tank is located between the rows of channels.

47. A crop drier as claimed in claim 25, wherein the length of each of said consecutive channels is adapted to be increased.

48. A crop drier as claimed in claim 25, wherein the upper channel portion of said consecutive channels are adapted to be displaced in a vertical direction.

49. A crop drier as claimed in claim 25, wherein means are provided for selectively changing the velocity of air flowing through said channels.